United States Patent [19]

Belart

[11] Patent Number: 4,598,625
[45] Date of Patent: Jul. 8, 1986

[54] VACUUM-OPERATED BRAKE POWER BOOSTER

[75] Inventor: Juan Belart, Walldorf, Fed. Rep. of Germany

[73] Assignee: ITT Industries, Inc., New York, N.Y.

[21] Appl. No.: 661,169

[22] Filed: Oct. 15, 1984

[30] Foreign Application Priority Data

Oct. 19, 1983 [DE] Fed. Rep. of Germany ....... 3337894

[51] Int. Cl.$^4$ .................................................. F15B 9/10
[52] U.S. Cl. .................... 91/369 R; 91/376 R
[58] Field of Search ............ 91/369 A, 369 B, 369 R, 91/376 R; 60/547.1, 554

[56] References Cited

U.S. PATENT DOCUMENTS

| 4,283,911 | 8/1981 | Nakamura et al. | 91/369 A X |
|---|---|---|---|
| 4,472,997 | 9/1984 | Ohmi | 91/369 A |

FOREIGN PATENT DOCUMENTS

| 2493784 | 5/1982 | France | 91/369 A |
|---|---|---|---|
| 2064690 | 6/1981 | United Kingdom | 91/369 A |
| 2065809 | 7/1981 | United Kingdom | 91/369 A |
| 2074677 | 11/1981 | United Kingdom | 91/369 A |

Primary Examiner—Robert E. Garrett
Assistant Examiner—Mark A. Williamson
Attorney, Agent, or Firm—James B. Raden; Donald J. Breh

[57] ABSTRACT

A vacuum-operated brake power booster, including a control valve comprising a control valve piston with valve seat actuated by the piston rod, a poppet valve with two valve seat faces and a valve seat at the longitudinally slidable control valve body. The movements of the poppet valve relative to the two valve seats are controlled by a transverse member embracing the neck of the poppet valve. The radially external end of the transverse member touches the stationary sealing ring in the release position of the brake. For the purpose of interaction of the poppet valve with the transverse member, the neck of the poppet valve is furnished with an annular groove at its radially external peripheral surface, the width of the annular groove being sized larger than the thickness of the transverse member which engages in that groove. With the transverse member touching against the stationary sealing ring on the one hand and with the exactly sized axial play between the transverse member and the poppet valve on the other hand, the lost motion of the valve is reducible to zero.

8 Claims, 3 Drawing Figures

VACUUM-OPERATED BRAKE POWER BOOSTER

A related application is filed of even date herewith under a like title by W. Wagner.

The invention relates to a vacuum-operated brake power booster with an axially movable wall sealed relative to a vacuum housing. A piston rod coupled to a brake pedal serves to actuate a control valve by means of which a power chamber of the brake power booster is connectable selectively to vacuum or to a more elevated differential pressure. A first valve is formed by a valve seat at the control valve body and a poppet valve preloaded in the direction of the valve seat. A second valve is formed by that same poppet valve and a control piston connected to the piston rod, the axially movable wall being in effective linkage with the control valve body. A guide is provided in the control valve body. The guide extends at right angles to the longitudinal axis of the control valve body and is in effective linkage with a transverse member penetrating through the guide. One free end of the traverse member projects beyond the peripheral surface of the control valve body to touch against the vacuum housing in the release position of the brake.

BACKGROUND OF THE INVENTION

Conventional vacuum-operated brake power boosters as a rule have a housing in which there is an axially movable wall which is adapted to be advanced and retracted within the vacuum housing to divide the inner space of the housing into two chambers, i.e., one chamber on each side of the axially movable wall. By means of the two chambers, a pressure difference can be generated on the opposite sides of the movable wall, which pressure difference results in the movable wall being shifted in the direction of the lesser pressure. A vacuum-operated brake power booster of this type furthermore comprises a control valve which is actuated through the brake pedal and which controls the amount of vacuum acting on the one side of the axially movable wall. As a rule, the axially movable wall is connected to the brake master cylinder of a hydraulic braking system of the automotive vehicle in such a manner that when the pressure difference has its effect on the movable wall forcing a movement of the movable wall, brake fluid is displaced from the brake master cylinder into the hydraulic braking system to apply the brakes of the vehicle.

In the design of braking systems for automotive vehicles, it is expedient to configure the vacuum-operated brake power booster in a manner so that the brake response phase in which the driver moves the brake pedal and interrupts the connection of flow between the two sides of the axially movable wall by means of the control valve is reduced to a minimum.

A brake power booster of the type generally disclosed herein is known from German printed and published patent application 3,042,096 Al. In this a wedge is provided which is seated with play both in the control valve piston and in the control valve body. The wedge is adapted to abut against the housing of the brake power booster in such a way that in the release position of the brake, the vacuum valve seat is lifted a minute distance from the poppet valve. This known brake power booster has the disadvantage that the potential lost motion cannot be completely reduced to zero.

SUMMARY OF THE INVENTION

The present invention has as its object to create a brake power booster for an automotive vehicle braking system in which the response of brake actuation is reducible to zero and in which more elevated pressure is directly exerted on one side of the booster movable wall when the driver moves the brake pedal during braking in order to actuate the control valve of the brake power booster.

According to the invention, this object is achieved in that there is transverse member penetrating through a guide of the control valve body in effective linkage directly with the poppet valve and with its radially internal end to engage in a recess provided at the poppet valve. Preferably, the radially internal end of the transverse member has a fork-shaped configuration and with its two radially extending arms embracing the neck of the poppet valve.

In a preferred embodiment, the poppet valve is reinforced by a liner which connects the front area of the poppet valve and the valve seat of the control valve piston to a shoulder of the poppet valve. The front area cooperates with the valve seat of the control valve body, in this manner excluding a shift of the front area relative to the shoulder.

Expediently, the recess provided at the poppet valve for the transverse member is configured as a circumferential groove arranged at the end of the poppet valve facing the control valve piston. The liner stiffening the poppet valve in the range of the latter's end portion is advantageously configured as a reel-shaped element which is stamped from sheet or plate metal and embedded in the rubbery-elastomeric material of the poppet valve, with radially extending flanges of the liner stiffening the shoulder and the front area of the poppet valve. In order to render possible a smooth operation of the control valve, the groove-shaped recess provided in the area of the neck of the poppet valve has a width which is sized larger than the thickness of the transverse member.

BRIEF DESCRIPTION OF THE DRAWINGS

The principle of the invention may be used in a number of embodiments, one of which is shown in more detail in the accompanying drawings, in which.

DETAILED DESCRIPTION

Figure 1:
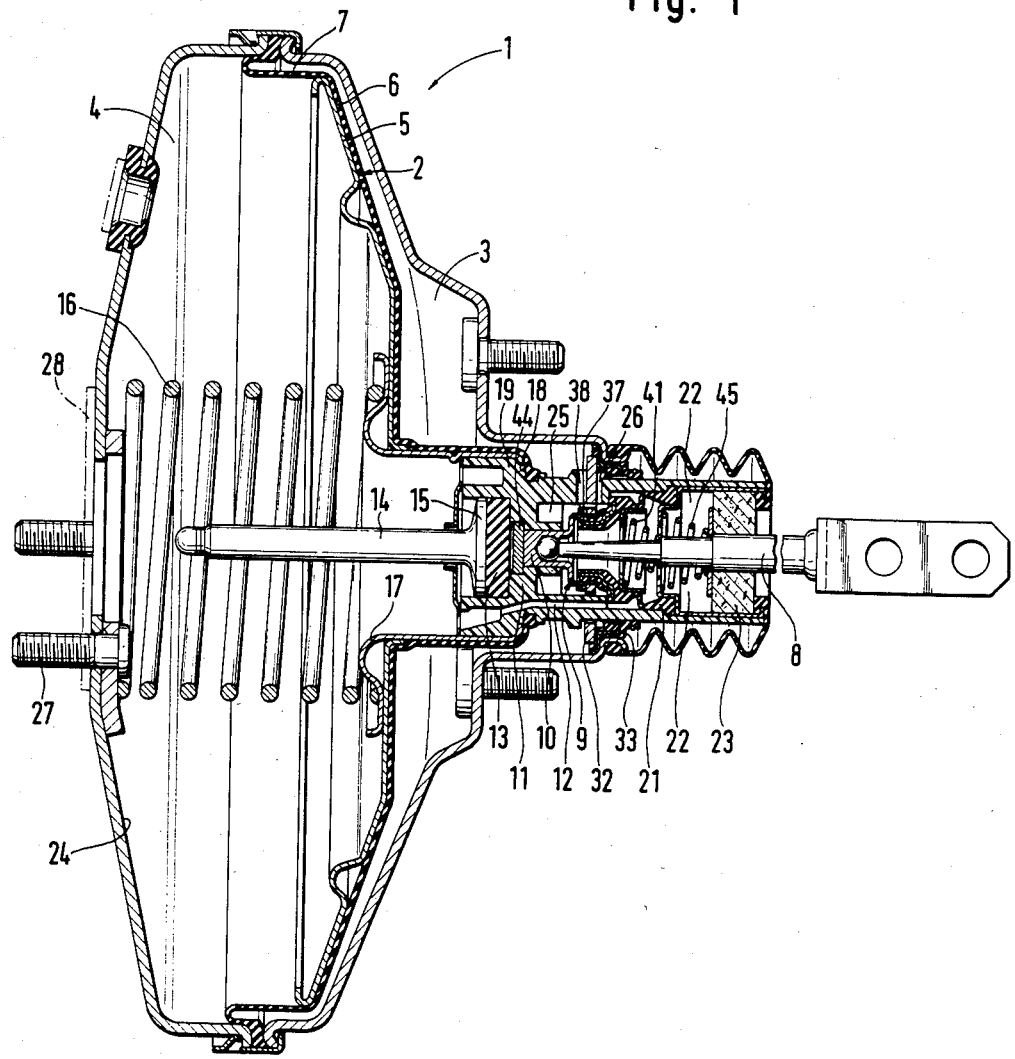
FIG. 1 is a longitudinal section through a vacuum brake power booster shown in the release position with the related master cylinder deleted.
Figure 3:
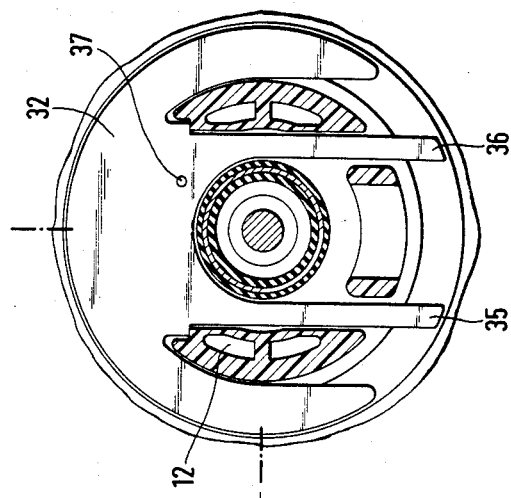
FIG. 3 is a cross-section through the control valve of the brake power booster showing the transverse member in side elevation.

The brake power booster shown in FIG. 1 is provided with a vacuum housing 1 which is divided into a power chamber 3 and a vacuum chamber 4 by means of an axially movable wall 2. The axially movable wall 2 is comprised of a dished diaphragm disc 5 made from deep-drawn sheet or plate metal and a flexible diaphragm 6 snugly adhering to it and forming a rolling diaphragm 7 as a seal between the periphery of the dished diaphragm disc 5 and the vacuum housing 1.

A control valve 9 actuatable by a piston rod 8 is furnished with a control valve piston 10 linked to the brake pedal piston rod 8. The piston controls valve openings within a control valve body 11 is such a way that in the non-actuated or released position shown in FIG. 1, the power chamber 3 is separated from the vacuum chamber 4. In this position, passage through the air guide ducts 12 running laterally within the control valve body 11 and on to the front side ending up at the periphery of the control valve body 11 is interrupted. In the event of actuation of the control valve 9, that is in the event of an axial slide of the piston rod 8, the connection from the vacuum chamber 4 toward the power chamber 3 remains interrupted, the power chamber 3 being, however, connected to the atmosphere so that the movable wall 2 moves in the direction of the vacuum chamber 4.

By means of a rubbery-elastomeric reaction disc 13 mounted in a front-side depression of the control valve body 11 and via a push-rod 14 provided with a head flange 15, braking power is transmitted to an actuating piston of a braking system master cylinder (not shown) which is mounted at the vacuum side end of the brake power booster.

A compression spring 16 supported on the inside wall 24 of the vacuum housing 1 and at the diaphragm disc 5 acts to retain the movable wall 2 in the release position shown in the drawing.

The diaphragm disc 5 comprises a cup-shaped hub portion 17 from which a retaining flange 18 projects radially inwardly into abutment with a shoulder 19 of the control valve body 11.

Within the control valve body 11, the control valve piston 10 is retained and guided in such a manner that in the event of a slide of the piston rod 8 in the direction of the arrow A, the valve seat 20 lifts off the poppet valve 21 permitting the inflow of atmospheric air into the annular chamber 25 from the chamber 22 which is in connection with the ambient air via a filter 23. The annular chamber 25, is in connection with the power chamber 3 via a guide 26 extending radially through the control valve body 11 and via a duct 38 formed by a groove. Atmospheric air flows into the power chamber 3, moving the axially movable wall 2 in the direction toward the inside wall 24 against the force of the spring 16. Since the axially movable wall 2 is rigidly connected to the control valve body 11, the push-rod 14 will also move to the left and exert force upon the master cylinder (not shown) which is secured to the flange 28 of the vacuum housing 1 by means of the bolts 27.

When the piston rod 8 is moved back into its initial position in the direction opposite that indicated by the arrow A under the force of the retractor spring 45, the valve seat 20 of the control valve piston 10 will again come to be seated again on the poppet valve 21, shutting off the air passage from the chamber 22 to the annular chamber 25 and, consequently, to the power chamber 3. During this return movement, the control valve body 11 moves to the right sufficiently for the shoulder 29 of the poppet valve 21 to be lifted off the valve seat 30 of the control valve body 11. A connection is thereby established from the power chamber 3 over a passageway via the guide 26, duct 38, and annular chamber 25 to annular chamber 31 and from the latter via the air guide duct 12 to the vacuum chamber 4.

As a result of the equalization of pressure between the vacuum chamber 4 and the power chamber 3, the axially movable wall 2 moves to the right together with the control valve body 11 until the outer end portion of a transverse member 32 sealingly engages against the sealing ring 33 which is rigid with the vacuum housing 1. The transverse member 32 extends across the hereinabove set-out passageway between the working chamber 3 and vacuum chamber 4 and has an inner-radial end sealingly engaged in the recess in the poppet valve behind the front area 40 when in the release position of the brake. With the outer end and inner end of the transverse member respectively sealed against the sealing ring and poppet valve, the passageway between the working chamber and the vacuum chamber is closed by the transverse member at a location along the passageway on the power chamber side of the valve which is defined by the seat 30 and the shoulder 29 when in the release position of the brake.

With the aid of its arms 35 and 36, the transverse member 32 partly embraces the neck 34 of the poppet valve 21 and is secured against a radial shift at the control valve body 11 by means of a stud 37. In axial direction, along the line of the arrow A, the transverse member 32 is slidable by an exactly predetermined measure resulting from the width b of the guide 26 and the thickness f of the transverse member 32. The extent of slidability of the transverse member 32 predetermines, in turn, the maximum opening travel of the poppet valve 21 relative to the two valve seats 20 and 30, since the movement of the end portion e of the poppet valve 21 is determined by the width g of the neck 34.

Figure 2:
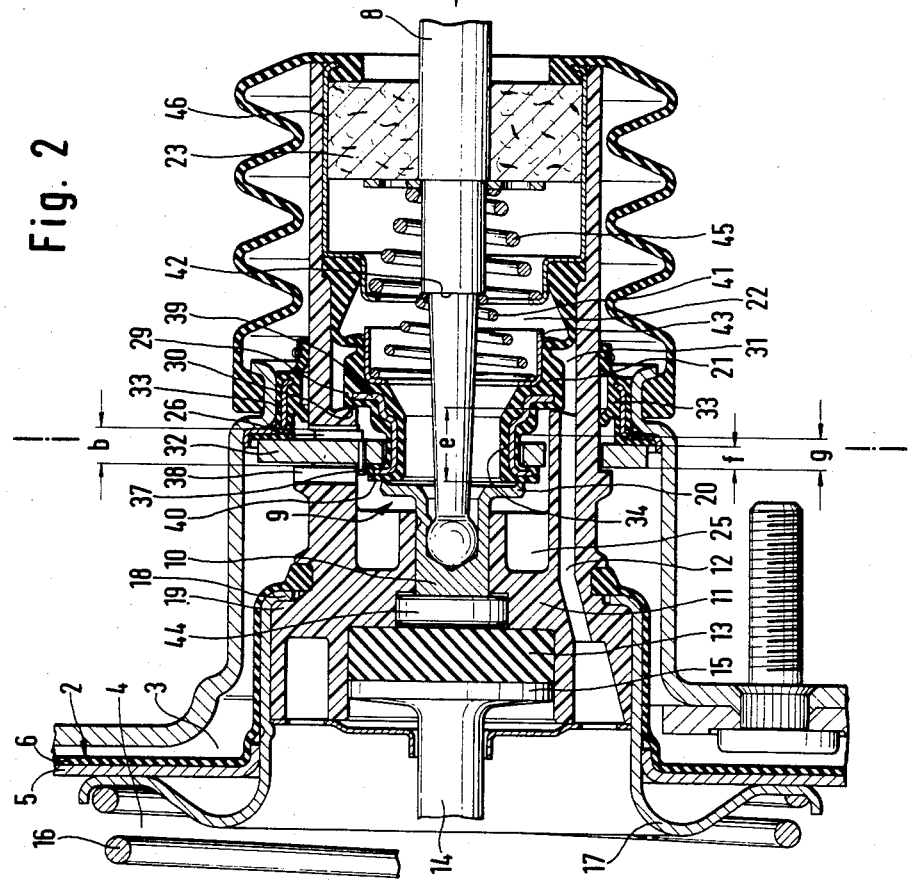
FIG. 2 is a longitudinal part-section through the control valve of the vacuum brake power booster according to FIG. 1, shown in larger scale.

In order that potential lost motion at the piston rod 8 is totally prevented or else exactly defined, the end portion e of the poppet valve 21 is reinforced with a rigid liner 39, so that in the brake release position shown in FIG. 2, the front area 40 at the master cylinder-side end of the end portion e of the poppet valve 21 cannot slide to the left relative to the control valve body 11 any farther than shown in the drawing.

In order to safeguard the abutment of poppet valve 21 shoulder 29 firmly against the valve seat 30 in the braking position, that is when the piston rod 8 has slid in the direction of the arrow A, there is provided a compression spring 41 whose one end rests on the shoulder 42 of the piston rod 8 and whose other end urges the poppet valve 21 via a flange element 43 against the valve seat 30 in the closing direction of the poppet valve 21. Immediately upon actuation of the brake, that is as soon as the piston rod 8 moves in the direction of actuation (to the left), the valve passage between the front area 40 and the valve seat 20 of the control valve piston 10 is opened. A consequential movement of the end portion e of the poppet valve 21 cannot take place in this instance, since the liner 39 which is supported by the valve seat 30 ensures that the front area 40 remains exactly in the same position relative to the control valve body 11 as it is in the brake release position.

In the release position, that is when the control valve body 11 has moved in the direction opposed to that indicated by the arrow A, the retractor spring 45 can urge the end portion e of the poppet valve 21 sufficiently to the right via the piston rod 8 and the control valve piston 10 that the shoulder 29 of the poppet valve 21 is lifted from the valve seat 30. In the course of the return movement of the control valve body 11, as soon as the transverse member 32 touches the sealing ring 33 which is stationary, and is rigidly coupled to the vacuum housing 1, the passage between the valve seat 30 and the shoulder 29 is also closed.

What is claimed is:

1. A vacuum-operated power booster comprising an axially movable wall sealed relative to a vacuum housing, said booster including a piston rod adapted to be coupled to a brake pedal for movement between a brake release position and a fully braked position and which serves to actuate control valve means including a control valve body, a control valve piston and a poppet valve by means of which a power chamber is selectively connectible to a vacuum or to a more elevated atmospheric pressure, and in which a first valve located in a first passageway between said power chamber and a vacuum chamber of said booster is defined by a first valve seat on the control valve body and a circumferential shoulder on the poppet valve at a location intermediate a front area and a rear end of said poppet valve, means for preloading said poppet valve in a direction toward said first valve seat whereby said first valve is maintained normally closed in the brake release position, and a second valve located in a second passageway between said power chamber and the atmosphere is defined by the front area of the poppet valve and a second valve seat located on the control valve piston, the second valve also being maintained normally closed in the brake release position, the axially movable wall being in effective linkage with said control valve body, a guide extending through said control valve body at right angles to the longitudinal axis of said control valve body, said guide being in effective linkage with a transverse member having a portion extending through said guide, said portion projecting beyond the peripherial surface of said control valve body across said first passageway and having one end thereof sealingly engaged against said vacuum housing in the release position of the brake, the portion of the transverse member extending through said guide in said control valve body is in effective linkage directly with said poppet valve and includes a radial internal end sealingly engaged in a recess in the poppet valve in the release of the brake, whereby said first passageway is closed by said transverse member when in the release position of the brake at a location along the first passageway on a side of said first valve closest to said power chamber.

2. A vacuum-operated brake power booster as claimed in claim 1, in which said radial internal end of said transverse member has a fork-shaped configuration comprised of two radially extending arms which embrace a neck portion of said poppet valve at a location proximate said recess.

3. A vacuum-operated brake power booster as claimed in claim 1, in which said poppet valve includes a rigid liner extending from the front area of said poppet valve to the circumferential shoulder of said poppet valve, whereby said poppet valve is substantially rigid along its length between said front area and said circumferential shoulder preventing an axial shift of said front area relative to said shoulder.

4. A vacuum-operated brake power booster as claimed in claim 3, in that said liner is configured as a reel-shaped element stamped from sheet or plate metal and embedded in rubbery-elastomeric material of said poppet valve with two radially extending flanges of said liner stiffening said shoulder and said front area of said poppet valve.

5. A vacuum-operated brake power booster as claimed in claim 1, in which said recess comprises a circumferential groove located proximate the end of said poppet valve facing said control valve piston.

6. A vacuum-operated brake power booster as claimed in claim 5, in which said groove-shaped recess has a width which is sized larger than the thickness of said transverse member.

7. A vacuum operated brake power booster as claimed in claim 1, in which the rear end of said poppet valve is rigidly coupled to said control valve body and a resilient bellows-shaped portion of said poppet valve is located between said rear end and the circumferential shoulder.

8. A vacuum-operated brake power booster as claimed in claim 7, in which the first valve is maintained normally closed in the brake release position by the force of a compression spring, said spring being supported at one end on a shoulder of the piston rod and supported at a second end on a step of the inside wall of said poppet valve in an area behind the shoulder.

* * * * *